Figure 3:
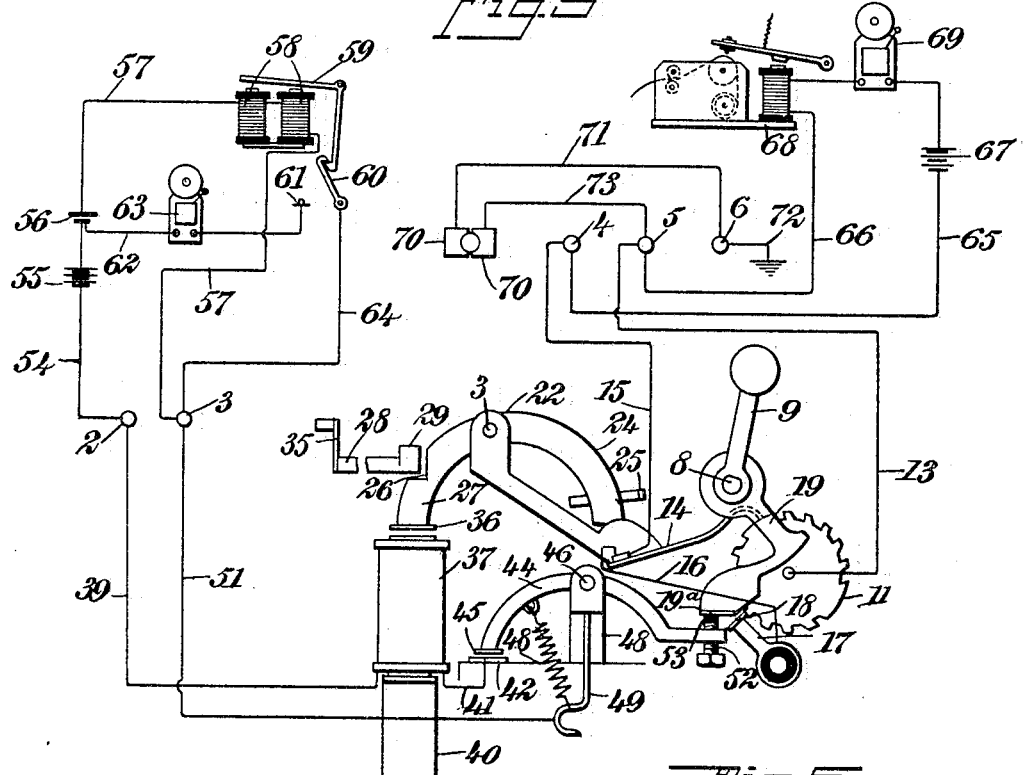

No. 782,066. PATENTED FEB. 7, 1905.
A. D. SHAW.
AUTOMATIC ALARM TELEGRAPH.
APPLICATION FILED APR. 15, 1904.
2 SHEETS—SHEET 1.
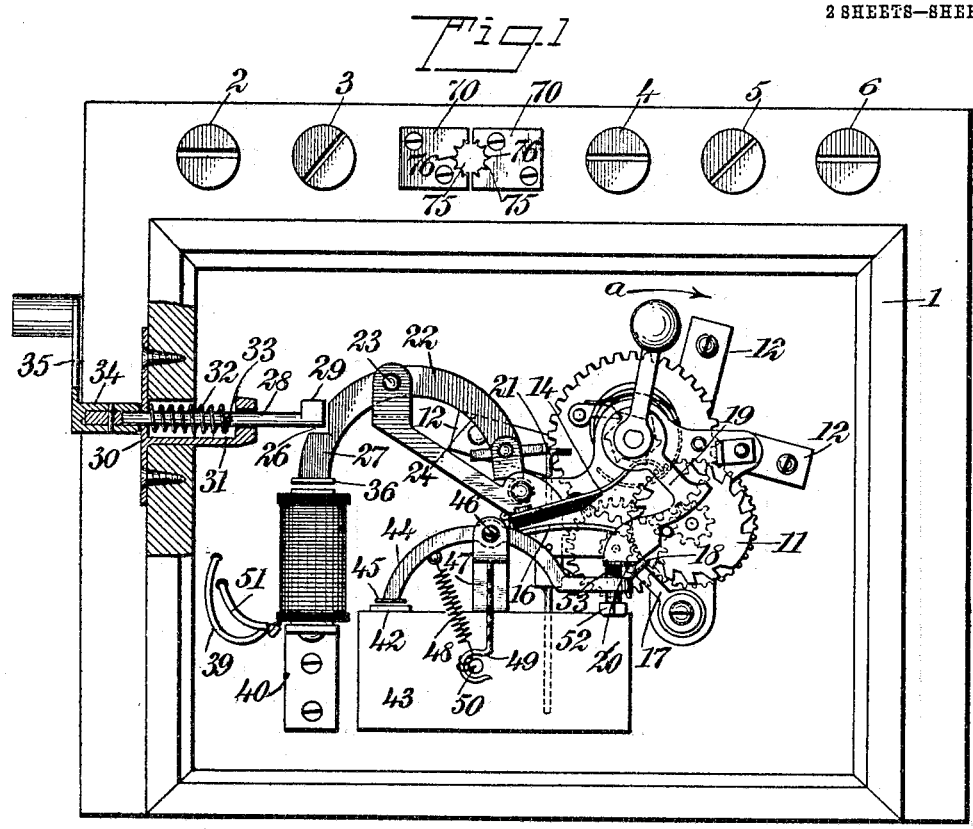
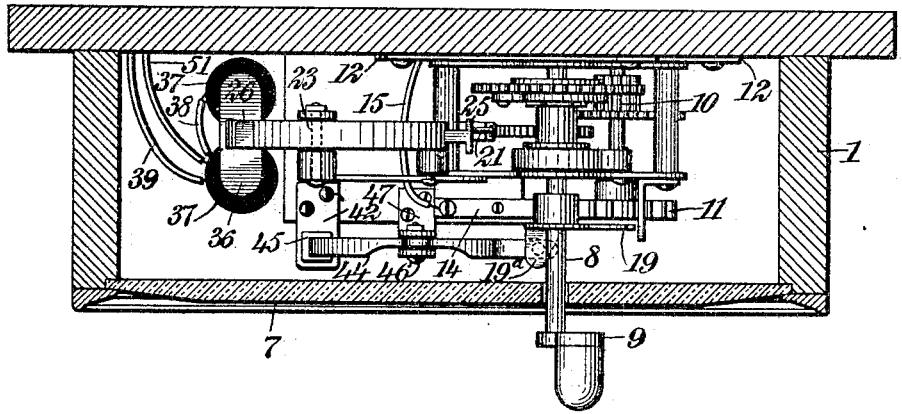
WITNESSES:
INVENTOR
Albert D. Shaw
BY
ATTORNEYS No. 782,066. PATENTED FEB. 7, 1905.
A. D. SHAW.
AUTOMATIC ALARM TELEGRAPH.
APPLICATION FILED APR. 15, 1904.

2 SHEETS—SHEET 2.

WITNESSES:
J. A. Brophy
Baxter Morton

INVENTOR
Albert D. Shaw
BY
Munn
ATTORNEYS

No. 782,066.

Patented February 7, 1905.

UNITED STATES PATENT OFFICE.

ALBERT DAVIDSON SHAW, OF NEW YORK, N. Y.

AUTOMATIC ALARM-TELEGRAPH.

SPECIFICATION forming part of Letters Patent No. 782,066, dated February 7, 1905.

Application filed April 15, 1904. Serial No. 203,339.

*To all whom it may concern:*

Be it known that I, ALBERT DAVIDSON SHAW, a citizen of the United States, and a resident of the city of New York, borough of Brooklyn, in the county of Kings and State of New York, have invented a new and Improved Automatic Alarm-Telegraph, of which the following is a full, clear, and exact description.

This invention relates to automatic telegraphic instruments, and more particularly to that class of automatic telegraphs used for the transmission of signals for the purpose of summoning messengers, calling police, sending fire-alarms, and giving notice of the entry of burglars into a house.

The principal object of the invention is to provide an automatic telegraphic instrument adapted for use for any of the purposes above stated and so constructed that when it is set to sound an alarm whenever burglars break into a house supplied therewith the circuit connecting the instrument with the door or window or other opening through which entry to the house is had will be kept open until the time of the entry of the burglar, thus obviating the waste of the battery by which the current which operates the instrument is furnished and preventing the instrument from becoming inoperative through the exhaustion of the battery.

A further object of the invention is to provide a telegraphic instrument of the type specified in which means is provided for automatically breaking the circuit through the instrument as soon as the complete signal announcing the entry of burglars into the building has been transmitted from the instrument to the central station with which the instrument is connected.

A further object of the invention is to provide in an instrument of the type specified improved means whereby the instrument may be instantly set to operate as a burglar-alarm on the opening of a door, window, or other aperture leading into a house or to serve as a messenger-call, police-call, or fire-alarm by the manipulation of a crank or lever.

Still another object of the invention is to provide the instrument with an improved form of "ground-plate" to enable the connections of the instrument with the central station to be tested to locate a break in the connection.

With the objects above stated and others which will hereinafter appear as the invention is more fully described the same consists in a novel construction, combination, and arrangement of parts of an automatic telegraphic instrument, as hereinafter described, and particularly pointed out in the appended claims, it being understood that various changes in the form, proportions, and exact mode of assemblage of the elements described may be made without departing from the spirit of the invention or exceeding the scope thereof.

Reference is to be had to the accompanying drawings, forming a part of this specification, in which similar characters of reference indicate corresponding parts in all the views.

Figure 4:
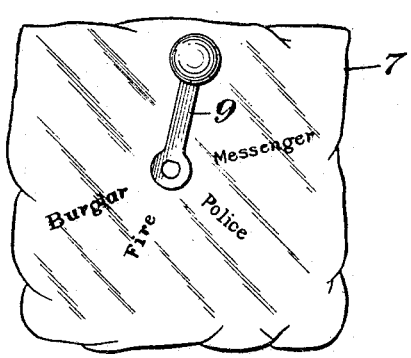
Figure 5:
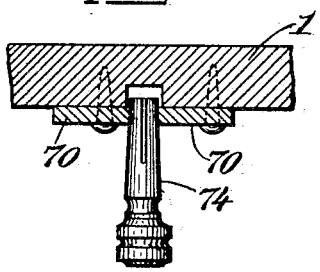
Figure 6:
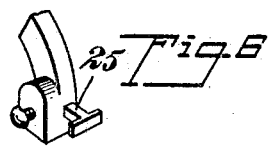

Figure 1 is a front elevational view of the instrument inclosed within a suitable casing having a glass front to enable the position of the parts to be clearly seen, part of the casing being broken away to show the arrangement of the setting crank and shaft. Fig. 2 is a horizontal sectional view through the upper part of the casing of the instrument, the instrument being shown in plan within the casing. Fig. 3 is a diagrammatic view showing the preferred arrangement of the circuits connected with the instrument and illustrating the operation of the instrument. Fig. 4 is a detail view of a portion of the glass front preferably provided upon the instrument-casing and showing the position at which the winding-crank should be set to close the various signals for which the instrument is provided. Fig. 5 is a detail sectional view, in a horizontal plane, through the ground-plate, showing the plug inserted therein to complete the circuit for testing purposes; and Fig. 6 is a detail view in perspective of one end of the trip-lever by means of which the motor of the instrument is released.

Described in general terms the instrument which forms the present invention consists of a small spring-motor mounted within a casing and a rotary circuit-breaker which is interposed in a circuit connecting the instrument with the central station, means for setting the motor to send a plurality of signals through the circuit leading to the central station by means of the rotation of the circuit-breaker one or more times, a local or house circuit connecting the instrument with the various points of the house in which the instrument is located at which entry into the house may be effected, and means controlled by the local or house circuit for releasing the motor and causing the transmission of a signal to the central station.

Referring to the accompanying drawings by reference characters, 1 designates the casing of the instrument, which may be of any suitable form, and 2, 3, 4, 5, and 6 are binding-posts provided on the outside of the casing for the connection of the electric circuits with the instrument, the binding-posts being connected with the parts of the instrument itself by suitable conductors the arrangement of which will hereinafter be explained. At the front of the casing a plate 7 of glass is provided, and through this plate extends a shaft 8, provided with a winding-crank 9, by means of which a spring-motor 10, which may be of any suitable form, may be wound to impart one or more complete rotations to a rotary circuit-breaker 11. As the spring-motor, consisting of the spring and a suitable train of gearing, and the rotary circuit-breaker are common in instruments of this class, detailed description thereof appears to be unnecessary.

The motor 10 and the circuit-breaker 11 are both secured upon a suitable base which is secured within the casing by means of screws extending through lugs 12, projecting from the base, as shown in Figs. 1 and 2, and these parts being all of metal form a conductor for the electric current which passes along a conductor 13, extending from the binding-post 5 and connected to the base of the motor. Contact with the rotary circuit-breaker is maintained by a spring 14, which is insulated from the motor at its point of support and is connected, by means of a conductor 15, with the binding-post 4. As the surface of contact of the end of the spring 14 with the rotary circuit-breaker 11 is small and the accumulation of a little dust or other foreign material on the periphery of the circuit-breaker might interfere with the continuity of the electric circuit through the spring 14 and circuit-breaker 11 when the parts of the instrument are in the position shown in Fig. 1, a supplemental connection between the conductor 15 and the base of the motor is afforded by an insulated wire 16, which extends to an arm 17, mounted upon the base of the motor, but insulated therefrom. The arm 17 presents at its free end a lug 18, and upon the shaft 8 there is mounted a bent arm 19, which is provided with a platinum contact-point 20, which engages the lug 18 when the motor is in the position of inactivity. (Shown in Fig. 1.) As the arm 19 is formed of conducting material and is mounted upon the shaft 8 without insulation, the circuit is completed from the conductor 15 through the wire 16, the arm 17, and the arm 19 to the motor, which is connected with the conductor 13, as already explained.

To wind the motor, the winding-crank is turned in the direction indicated by the arrow $a$ in Fig. 1, and the character of the signal to be sent by the instrument is determined by the position at which the crank 9 is set. As shown in Fig. 4, the crank may be set in four different positions, and for each position there is a special signal. Thus when the crank is set over the word "Messenger" the motor is wound sufficiently to impart one rotation only to the rotary circuit-breaker, and a single signal is sent from the instrument to the central station. This signal is usually simply a number, and the only change in an instrument necessary to adapt it to send a different signal is the substitution of another rotary circuit-breaker having the notches thereon differently arranged to interrupt the current in a different manner, as is usual in such instruments. By setting the crank 9 over the word "Police" two rotations of the rotary circuit-breaker may be produced, and the number of the instrument will be repeated at the central station. Similarly if the crank be set over the word "Fire" the number will be sent three times to the central station, and if the crank is set over the word "Burglar" the number will be sent four times. Thus it is evident that four different signals may be produced by the same instrument by simply setting the winding-lever of the motor in four different positions.

The setting of the motor 10 is controlled by a detent 21, and when the detent is in the position shown in Fig. 1 it will automatically hold the motor against operation when the winding-crank is swung around to any position in its range of movement. The detent is held normally in operative position by means of the pivoted trip-lever 22, which is preferably of approximately semicircular form, as shown, is pivotally supported upon a pivot-pin 23, which is so located that the longer arm 24 of the trip-lever lies on the side adjacent to the detent 21, and is normally drawn downward by the action of gravity. The trip-lever 22 is provided near the end of the arm 24 with a T-shaped projection 25, which normally engages an elbow in the detent 21 and holds it in operative position. In order to release the detent to permit the operation of the motor when wound, a notch 26 is formed in the short arm 27 of the trip-lever, and a shaft 28, having a lug 29 at the inner end thereof, is mounted in the side wall of the casing 1 in such position that the lug 29 may be brought into engagement with the bottom of the notch 26 by turning the shaft 28. This engagement of the lug 29 with the bottom of the notch 26 will rock the trip-lever 22 sufficiently to raise the T-shaped projection 25 at the end of the arm 22 out of contact with the detent 21 and the motor 10 will then be released, so that the spring of the motor may impart movement to the pinions thereof.

In order that the shaft 28 may be held in any desired position and prevented from accidentally turning through the jars imparted to the instrument by blows thereagainst or otherwise, the shaft is rotatably mounted in bearings afforded by a bracket 30, fixed upon the side of the casing 1 and having an arm 31 projecting within the casing. A spring 32 is coiled about the shaft 28, one end of the spring being in contact with a screw 33, mounted in the shaft 28, and the other engaging the bracket 30, so as to hold the shaft in position by the friction occasioned by the spring. The shaft is held against sliding movement under the influence of the spring by the contact of a crank-socket 34 upon the outer end of the shaft with the bracket 30, and a crank 35 extends at right angles to the socket to afford means for conveniently turning the shaft 28 when it is desired to do so.

When the instrument is to be used to transmit messenger-calls, police-calls, or fire-alarms, the shaft 28 is given a half-turn from the position shown in Fig. 1, so as to bring the lug 29 into engagement with the notch 27 of the trip-lever 22 and lift the T-shaped member 25 out of contact with the detent 21. Then when the crank 9 is swung around to the desired point and released, the motor will operate immediately to transmit the proper signal through the outside or station circuit to the central station. When the instrument is to serve as a burglar-alarm, however, the detent 21 must remain in the position shown in Fig. 1 until the entry of the burglar into the house, and the trip-lever 22 must then be thrown by the entry of the burglar into the house to release the detent 21 and permit the motor 10 to operate to sound the burglar-alarm signal. To this end the trip-lever 22 has at the end of the shorter arm 27 an armature 36, which is disposed above a pair of electromagnets 37, connected in series by a short conductor 38 and connected with the binding-post 2 by means of a conductor 39. From the electromagnets 37, which are supported upon a bracket 40 within the casing, a conductor 41 extends to a plate 42 of metal, which is mounted upon a block 43 of wood or other non-conducting material within the casing. Immediately above the plate 42 is one end of a bent lever 44, which is preferably provided at that end with a platinum plate 45, which is adapted to contact with the plate 42. The lever 44 is pivotally supported upon a pin or screw 46, mounted in a bracket 47, which is supported upon the block 43, and a fine-wire spring 48 connects the lever 44 with a hook 49, which extends downward from the bracket 47. The spring 48 is a conductor, and the wire thereof is continued through an aperture 50 in the block 43 to connect with a conductor 51, leading to the binding-post 3. At the end opposite the plate 45 the bent lever 44 carries a screw 52, provided at its tip with a block 53 of insulating material. This screw 52 is so placed that when the motor is in inoperative position the arm 19, carried by the shaft of the motor, engages with the block 53 of insulating material carried by the screw 52 and forces the screw downward sufficiently to tilt the lever 44 upon its pivot and raise the plate 45 out of contact with the plate 42, thus interrupting the continuity of the circuit through the plate 42, the lever 44, and the spring 48.

The binding-posts 2 and 3 are connected with the house or local circuit of the instrument. A conductor 54, diagrammatically illustrated, extends from the binding-post 2 to a generator 55, from which a conductor leads to each of the apertures by which entry may be had to the house. In the drawings only one such aperture is indicated, and a circuit-closer 56 is provided at each aperture, the circuit-closer being of such character that when the door, window, or other aperture is opened to permit the entry of the house the circuit-closer will automatically close and complete the circuit from the generator 55 through a conductor 57, which passes around magnets 58 and extends onto the binding-post 3. Adjacent to the magnets 58 is a pivoted armature 59, normally held out of contact with the magnets by means of a latch 60 so arranged that when not engaged by the pivoted armature 59 it will rest upon a post 61. The post 61 is one terminal of a conductor 62, extending from the circuit-breaker 56 through an electric bell 63 or other suitable signal, and the latch 60 is connected by a conductor 64 with the binding-post 3. Hence when the circuit-closer 56 is closed the current from the generator 55 will pass through the conductor 57, excite the magnets 58 to draw the armature 59 into contact therewith, and release the latch 60 from engagement with the armature. The latch 60 will then drop under the influence of gravity into contact with the post 61, and the circuit will then be complete between the generator 55 and the binding-post 3, permitting a current to pass through the bell 63, which will be set in operation. If the circuit-closer 56 be closed for an instant only and then opened again, the bell will continue to ring notwithstanding, as the circuit from the generator will be completed through the conductors 62 and 64, although the conductor 57 will be thrown out of the circuit.

The closure of the circuit-closer 56 results in the transmission of a current through the conductors 54 and 57 only when the plate 45 at the end of the lever 44 of the instrument is in contact with the plate 42, thus completing the connection with the instrument between the conductors 39 and 51, which extend inward from the binding-posts 2 and 3. Hence there can be no waste of the energy of the generator 55 when the motor is not in position to send a signal, as the lever 44 is held in the position shown in Fig. 1 when the motor is not set for operation.

To set the instrument to act as a burglar-alarm, the lever 9 is swung around until it overlies the word "Burglar" upon the front plate 7 of the casing. The shaft 28 is set in the position shown in Fig. 1 with the lug 29 upward, allowing the weight of the longer arm of the trip-lever to cause the T-shaped member 25 to engage with the detent 21 and hold it in inoperative position. The armature 59 over the electromagnets 58 is set in the position shown in Fig. 3 by engagement with the latch 60, and then if the circuit-closer 56 be closed by the opening of a door or window or by a pressure upon the door-mat or in any other way the circuit through the magnets 58 and through the magnets 37 will be instantly completed. The completion of the circuit through the magnets 37 will cause the armature 36 to be drawn downward into contact with said magnets, raising the longer arm 24 of the trip-lever and releasing the detent 21, so that the motor is set in operation. The armature 59 over the magnets 58 is also drawn down at the same time, thus setting up a circuit through the bell 63 of the signal, so as to cause it to operate continuously as long as the circuit through the instrument remains unbroken.

When the instrument is set in operation, the crank 9 travels from the position in which it is set back to its normal position (shown in Fig. 1) and the arm 19, carried by the shaft of the motor, swings in the same direction, finally coming to rest in the position shown in Fig. 1, in which position the lug 19ª engages with the block 53 of insulating material upon the screw 52 and tilts the lever 54 sufficiently to raise the plate 45 out of contact with the plate 42, so interrupting the continuity of the circuit through the instrument and causing the bell 63 or other signal to cease its operation.

From the foregoing paragraphs it will be apparent that when the local or house circuit is completed by the operation of the circuit-closer 56 a current is allowed to pass through the circuit just long enough to permit the operation of the motor to send the proper signal, by means of the rotary circuit-breaker, through the outside or station circuit to the central station, and at the completion of the transmission of that signal the local or house circuit is broken by the engagement of the arm 19 with the insulating material carried by the screw 52 in the end of the lever 44. Thus the waste of the batteries or other generator of the local circuit when no signal is being sent from the instrument is completely obviated, and the possibility of the instrument becoming inoperative through the exhaustion of the battery or other generator in the local circuit is entirely prevented.

The exterior or station circuit, by means of which the instrument is connected with the central station, is diagrammatically indicated in Fig. 3 as being composed of conductors 65 and 66, leading from binding-posts 4 and 5, respectively, connecting with a generator 67 and passing through a suitable signaling device 68, which is preferably of the kind that print upon a traveling tape. The outside or station circuit may also pass through a bell 69 or other audible signaling device to attract attention to the operation of the signal 68 whenever the instrument is set in operation by its motor.

It is of course to be understood that the instrument which forms the present invention is intended to be used upon a closed station-circuit which passes through a plurality of such instruments, ordinarily a hundred instruments being placed upon a single circuit. By so arranging the instruments the cost of connecting each instrument with the central office and maintaining the service will be greatly lessened and a service of as great efficiency obtained as would be possible by means of separate circuits connecting the several instruments with the central station independently of each other.

In order to facilitate the testing of the conductors 65 and 66, which form the station-circuit, so as to locate a break therein in case of such an occurrence in either of the two conductors, the ground-plate, consisting of the two similar sections 70, is provided upon the casing of the instrument, and the binding-post 6, already mentioned, is connected with one of the ground-plate sections by means of a conductor 71. The binding-post 6 is also connected with the ground by a conductor 72, as diagrammatically shown in Fig. 3. From the other section of the ground-plate a conductor 73 extends to the binding-post 5, and in order to test the station-circuit to locate a break in either the conductor 65 or the conductor 66 it is only necessary to insert the spring-plug 74 into the opening formed by the two oppositely-disposed semicircular recesses 75, provided in the adjacent edges of the sections 70 of the ground-plate. The peculiar feature of novelty presented by the ground-plate shown in this application is found in the formation of the recesses 75, each of which is provided with a plurality of small notches 76, as clearly shown in Fig. 1, and the object of this provision of notches in the recesses is to prevent the accumulation of dust or other foreign material upon the surfaces of the two recesses from interfering with proper contact of the plug 74 with those surfaces. If the recesses are notched, as shown, the plug 74 will when turned in the opening formed by the two recesses scrape off the surfaces of the recesses any adherent foreign matter, which will then pass into the notches 76 and will not remain upon the surfaces of the recesses to prevent perfect contact of the plug therewith.

In the foregoing description no attempt has been made to show the form of cabinet or bracket by which the instrument and its casing are to be supported in a building, nor has any attempt been made to show the exact arrangement of the generator for the local or house circuit, the local signal, or the "constant-ring" attachment for the signal. All of these may be varied without in any way departing from the present invention, and in the description and illustration of these parts no attempt has been made to do more than disclose a typical arrangement.

It is to be understood that in the practical construction of the apparatus and in its installation it may be desirable to provide switches in both the local or house circuit and the outside or central-station circuit, whereby the local or house alarm may be made to operate independently of the station-circuit without interfering with the operation of the messenger, police, and fire-alarm calls and by means of which the station or outside circuit may be wholly disconnected with the instrument within the house.

Having thus described my invention, I claim as new and desire to secure by Letters Patent—

1. The combination in telegraphic apparatus, of signaling mechanism, and mechanism for controlling said signaling mechanism, comprising a generator, a normally open local circuit connected with said generator and comprising a pivoted lever, a spring connected with said lever to hold it normally in contact with a portion of the circuit, and means operated by the signaling mechanism to tilt the lever and break the local circuit at the completion of the operation of the signaling devices.

2. The combination in telegraphic apparatus, of signaling mechanism, comprising an outside or station circuit, a ground-plate comprising two spaced sections presenting oppositely-disposed recesses having notches therein, a conductor connecting one of said ground-plate sections with the ground, and a second conductor connecting the other of said ground-plate sections with one branch of the outside or station circuit.

3. In a telegraphic apparatus, the combination of a signal, signal-actuating mechanism provided with means for holding it in an inactive position, means for releasing said signal-actuating mechanism, said releasing means comprising a generator and a circuit normally opened and operated, upon the closure thereof, to release said signal, and automatic mechanism for opening said circuit after the alarm is given.

4. In a telegraphic apparatus, the combination of signaling mechanism, means for actuating the same, a normally open local circuit controlling said actuating mechanism, and means operated by said signaling mechanism after the completion of the signal only for opening the local circuit.

5. In a telegraphic apparatus, the combination of signaling devices adapted to be set and held inactive, means for actuating the same, mechanism for releasing said actuating means, said last-mentioned mechanism comprising a normally open circuit including a movable member, said actuating mechanism being released when said local circuit is closed, and mechanism operated by said signaling devices and provided with a member movable at the close of the signal for breaking the local circuit.

6. In a telegraphic apparatus, the combination of signaling mechanism adapted to be set, a detent to hold said signaling mechanism when set, a trip-lever normally operated to hold said detent in position for engagement with said signaling mechanism, electrical devices for tripping said lever, and means for locking said lever.

7. The combination of signaling mechanism, a releasing-lever therefor propelled by an electromagnet, means operated by an electric current for energizing said electromagnet, and mechanism actuated automatically by said signaling mechanism at the end of its operation for breaking said current.

In testimony whereof I have signed my name to this specification in the presence of two subscribing witnesses.

ALBERT DAVIDSON SHAW.

Witnesses:
   DENIS W. HYLAND,
   M. E. WILSON.